United States Patent
Mende et al.

(10) Patent No.: US 11,841,418 B2
(45) Date of Patent: Dec. 12, 2023

(54) METHOD AND DEVICE FOR DETERMINING AT LEAST ONE PARAMETER OF AN OBJECT

(71) Applicant: S.M.S. SMART MICROWAVE SENSORS GMBH, Braunschweig (DE)

(72) Inventors: Ralph Mende, Braunschweig (DE); Christoph Weihrauch, Braunschweig (DE)

(73) Assignee: S.M.S. SMART MICROWAVE SENSORS GMBH, Braunschweig (DE)

( * ) Notice: Subject to any disclaimer, the term of this patent is extended or adjusted under 35 U.S.C. 154(b) by 466 days.

(21) Appl. No.: 16/956,840

(22) PCT Filed: Dec. 20, 2018

(86) PCT No.: PCT/EP2018/086198
§ 371 (c)(1),
(2) Date: Jun. 22, 2020

(87) PCT Pub. No.: WO2019/122130
PCT Pub. Date: Jun. 27, 2019

(65) Prior Publication Data
US 2020/0333453 A1    Oct. 22, 2020

(30) Foreign Application Priority Data
Dec. 22, 2017   (DE) .................... 10 2017 131 114.9

(51) Int. Cl.
*G01S 13/58* (2006.01)
*G01S 13/38* (2006.01)
(Continued)

(52) U.S. Cl.
CPC ............ *G01S 13/584* (2013.01); *G01S 13/38* (2013.01); *G01S 13/53* (2013.01); *G01S 13/931* (2013.01); *G05B 2219/43* (2013.01)

(58) Field of Classification Search
CPC ........ G01S 13/584; G01S 13/38; G01S 7/356; G01S 13/343; G01S 7/354; G01S 7/415;
(Continued)

(56) References Cited

U.S. PATENT DOCUMENTS

2016/0019458 A1   1/2016 Kaufhold
2016/0259037 A1   9/2016 Molchanov et al.
(Continued)

FOREIGN PATENT DOCUMENTS

DE   10 2005 003 024 A1   8/2006
DE   10 2006 032 539 A1   1/2008
(Continued)

OTHER PUBLICATIONS

Molchanov et al.; "Multi-sensor System for Driver's Hand-Gesture Recognition"; IEEE Conference Paper, May 2015, entire paper.
(Continued)

*Primary Examiner* — Donald H B Braswell
(74) *Attorney, Agent, or Firm* — WC&F IP

(57) ABSTRACT

The invention relates to a method for determining at least one parameter of an object, wherein the method comprises the following steps:
  a. provision of a range-Doppler matrix,
  b. transfer of at least one part of the range-Doppler matrix to a neural network and
  c. identification of the at least one parameter by the neural network.

10 Claims, 2 Drawing Sheets

Figure 1:
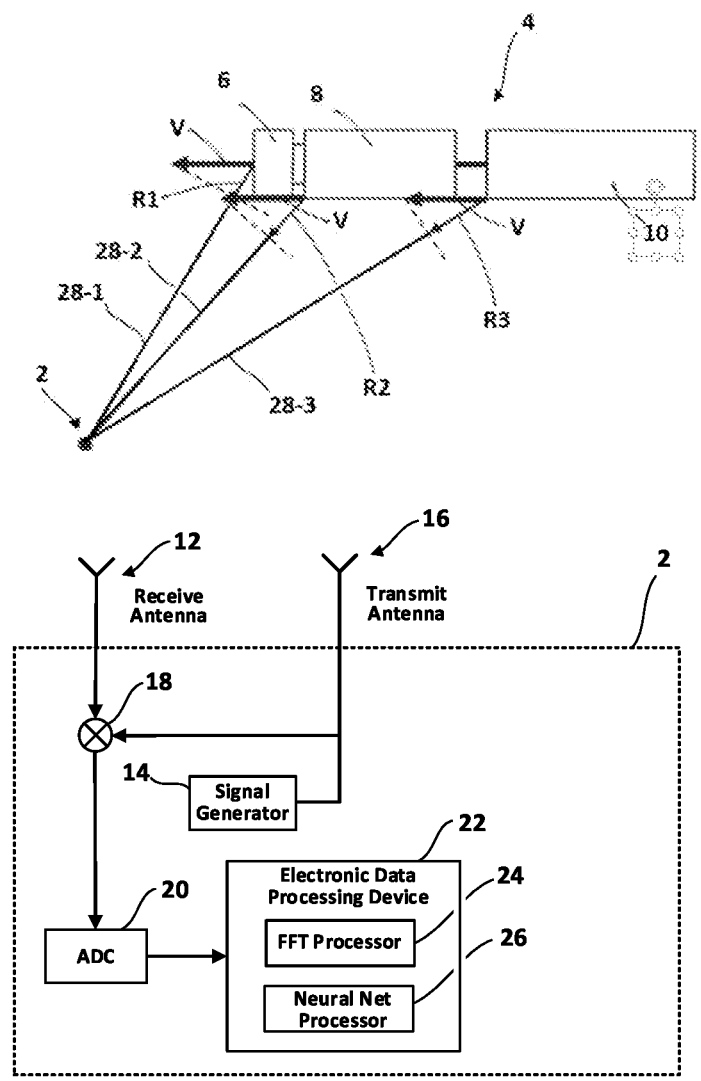

(51) Int. Cl.
*G01S 13/931* (2020.01)
*G01S 13/53* (2006.01)

(58) Field of Classification Search
CPC ........ G01S 7/417; G01S 13/536; G01S 13/91; G01S 7/411; G01S 13/58; G01S 13/64; G01S 13/93; G05B 2219/43
See application file for complete search history.

(56) References Cited

U.S. PATENT DOCUMENTS

| | | | |
|---|---|---|---|
| 2017/0115386 A1 | 4/2017 | Morinaga et al. | |
| 2017/0146648 A1* | 5/2017 | Lim | G01S 13/931 |
| 2017/0205501 A1 | 7/2017 | Liu et al. | |
| 2017/0294121 A1* | 10/2017 | Jain | G01S 13/931 |
| 2018/0149730 A1* | 5/2018 | Li | G01S 7/0234 |
| 2018/0307921 A1* | 10/2018 | Vallespi-Gonzalez | G01S 17/66 |
| 2019/0041494 A1* | 2/2019 | Roger | G01S 13/87 |
| 2020/0064996 A1* | 2/2020 | Giusti | G06F 3/011 |

FOREIGN PATENT DOCUMENTS

| | | |
|---|---|---|
| DE | 10 2012 008 350 A1 | 10/2013 |
| DE | 10 2017 105 783 A1 | 9/2018 |
| JP | 2016003873 A | 1/2016 |
| JP | 2017129410 A | 7/2017 |
| JP | 2017522548 A | 8/2017 |
| JP | 2018205174 A | 12/2018 |
| WO | 2006108275 A1 | 10/2006 |
| WO | 2015187468 A1 | 10/2015 |

OTHER PUBLICATIONS

Jokanovic et al.; "Multiple joint-Variable Domains Recognition of Human Motion"; IEEE Radar Conference Paper, May 2017, entire paper.
Capobianco et al.; "Vehicle classification based on convolutional networks applied to FM-CW radar signals"; Traffic Mining Applied to Police Activities, Jan. 2018, pp. 115-128.
Japanese office action dated Mar. 29, 2022.

* cited by examiner

METHOD AND DEVICE FOR DETERMINING AT LEAST ONE PARAMETER OF AN OBJECT

The invention relates to a device, especially a radar sensor, and a method for determining at least one parameter of an object, wherein the method comprises the provision of a range-Doppler matrix and the object is a road user.

Such methods are known from the prior art, particularly now in the field of traffic monitoring. An object is, for example, a road user, in particular a pedestrian, a cyclist, a passenger vehicle or a truck or bus. A sensor that can be used to conduct such a method emits a transmission signal in the form of radar beams using at least one transmitting antenna. The radar beam is reflected on the object whose at least one parameter is to be determined. The sensor also has at least one receiving antenna and receives reception signals in the form of the transmission signals reflected on the object. The radar sensor and the receiver are situated at a measurement point. It is common to determine the distance and radial velocity of the object relative to this measurement point in a single measuring cycle by means of suitably modulated radar signals, for example in the form of multiple frequency ramps. For example, two or more different types of frequency ramp are transmit-ted. Different types of frequency ramp differ in at least one parameter, such as the frequency deviation, the starting frequency, the end frequency or the ramp slope. The received reception signals are mixed with the transmission signals to form baseband signals, which are then evaluated. This results in at least one so-called range-Doppler matrix. Other modulation types are also possible.

Such a sensor can be arranged so that it is stationary, for instance on a transport route, or mobile, for instance on a motor vehicle.

When calculating a range-Doppler matrix, it is common to conduct two fast Fourier transformations (FFT). While the first FFT (range FFT) is conducted per ramp to ensure that, for example, for 256 ramps there are also 256 frequency spectra of the first FFT, the second FFT (Doppler FFT) is preferably carried out for each range value ("range gate"). However, it is also possible to only conduct the second FFT for selected range values. For example, it is possible to select the range gates for which a reflection has been detected. The result of the two FFTs can be presented in a range-Doppler (RDM) matrix. The calculation of such a range-Doppler matrix is known to experts. When using other modulation types, the calculation of the range-Doppler matrix may also occur in a different way.

The disadvantage of a range-Doppler matrix is that the distance of the object can generally be clearly recognized and read from it, but the velocity, determined via the Doppler shift of the reflected radar waves, cannot generally be clearly allocated. In the Doppler dimension, the range-Doppler matrix is generally ambiguous and has only a limited unambiguous range.

Methods are known from the prior art by means of which the useful Doppler evaluation range can be increased. For instance, DE 10 2012 008 350 A1 proposes the use of different types of frequency ramp as transmission waves. DE 10 2017 105 783, which has not been pre-published, proposes the simultaneous transmission of these different types of frequency ramp. Both methods result in an increase in the useful Doppler evaluation range of the range-Doppler matrix in the Doppler dimension by determining the interval of non-ambiguity. To this end, either separate matrices are formed for different types of frequency ramp or the signals of the different types of frequency ramp are simultaneously evaluated in a common matrix. Even if this only allows for an increase in the useful Doppler evaluation range to such an extent that it is completely unambiguous for the specific application, the matrix still only has a limited unambiguous range.

With current applications, it is often not enough to only determine the distance and/or a radial velocity of the object. Rather, other parameters are often determined in addition or alternatively to the specified parameters. For instance, it is important for traffic surveys and often for traffic light systems at intersections to assign the objects to particular classes. As such, it may be desirable to differentiate passenger vehicles from cyclists or trucks.

This information is generally not read from a range-Doppler.

The article entitled "Vehicle classification based on convolutional networks applied to FM-CW radar signals" arXiv: 1710-05718v3 from 31 Oct. 2017 describes the transformation of measurement signals into a frequency spectrum by way of a Fourier transformation and the subsequent transfer of said frequency spectrum to a neural network. Neural networks, in the present case a "Convolutional Neural Network", are artificial networks which have revolutionized the field of machine learning within the scope of artificial intelligence in computer technology. In a similar way to the human brain, such computer programs are able to read complex and high-quality information from data that has been transferred to them by particular mathematical methods and to allocate this reference information. As a result, networks are able to apply what they have "learned" at a later date and read the desired information from measured values and data that is transferred at a later date. However, this requires an unambiguous relation between the measurement signals or measurement data which are transmitted and the reference information to be determined, such as the classification of an object. If two parameters cannot be separated by way of the data and information transferred, the neural network is also not able to learn a difference.

US 2016/0019458 A1 describes a method in which such neural networks are used in order to determine information on traffic objects, in this case flying objects, from radar images ("synthetic aperture radar, SAR"). In this case, there is also an unambiguous relation between the radar data and the objects to be detected with their respective classes. However, this evaluation is not based on a range-Doppler matrix.

The use of artificial neural networks, such as the "convolutional neural networks" or "deep neural networks" has a number of advantages. Without such networks, parameters and rules would have to be specified which the computer that is responsible for the evaluation of the information and measurement data can use to detect and reliably allocate the different parameters. When artificial neural networks are used, this occurs via the applied mathematical operations, without having to manually generate the differentiation criteria and rules and enter them into the computer. Given that there must be an unambiguous relation between the radar data to be evaluated and the objects, parameters and object classes to be detected, a range-Doppler matrix does not appear to be well-suited to evaluation by a neural network (NN).

The invention aims to further develop a method for determining at least one parameter of an object in such a way that it can be conducted in a simple, quick and secure manner.

The invention solves the problem by means of a method for determining at least one parameter of an object, wherein the method comprises the following steps:

a.) Provision of a range-Doppler matrix,
b.) Transfer of at least one part of the range-Doppler matrix to a neural network and
c.) Identification of the at least one parameter by the neural network.

A neural network is also referred to as a neuronal network and may be, for example, a "convolutional neural network" (CNN) or a "deep neural network" (DNN) or a "recurrent neural network" (RNN).

In a preferred configuration, the at least one parameter is a distance and/or radial velocity relative to a measurement point, an expansion of the object in at least one, but preferably three, spatial directions, an object velocity of the object, at least one classification property and/or at least one classification of the object or the allocation of a zone of reflected energy to a physical object. It is therefore possible to determine, for example, the length and height of an object and to then draw conclusions concerning classification properties and/or the entire classification of, for instance, a road user, especially a vehicle, and preferably to output them.

The invention is based on the surprising insight that a range-Doppler matrix can be evaluated by a neural network. For example, it is possible to use the above-mentioned method to increase the useful Doppler evaluation range of a range-Doppler matrix (with intrinsically ambiguous distance and/or velocity information) to such an extent that it covers the entire range of interest of, for instance, a radial velocity of an object that is to be observed, i.e., it is completely unambiguous for the specific application. As such, with regards to the detection of radial velocities of trucks, for example, it is enough for the range-Doppler matrix to have a useful Doppler evaluation range which enables the unambiguous determination of velocities between 0 km/h and 100 km/h. The likelihood of encountering trucks moving at a higher speed on a transport route is low, so that the useful Doppler evaluation range of the range-Doppler matrix covers the entire parameter range of interest.

As an alternative or in addition to the previously described method for increasing the useful Doppler evaluation range, another approach can also be used. To this end, each object is not allocated a single peak, a local maximum, but rather a larger section or area of the range-Doppler matrix. While methods from the prior art assume with regards to range-Doppler matrices that the object which reflects the transmission signals can be detected in the range-Doppler matrix as a point or a peak, i.e., a local maximum, this is not necessarily the case, in particular with regards to expanded objects. In particular, when using radar sensors with high spatial resolution, different parts of an object can be detected as different local maxima in the range-Doppler matrix, as the transmission signals emitted are reflected at different points of the object. It is thus possible, for instance, that in the case of a truck, a part of the transmission signals is reflected by the windscreen of the tractor unit. Another part of the transmission signals is reflected by a front wall of a trailer or a container, while a third part of the transmission signals is reflected by rotating wheels of a trailer, for example. Of course, other additional points of reflection are possible. In the same way, different parts of the emitted transmission signals can be reflected from different parts and positions of the object, even with smaller objects. Therefore, the observed objects are often not only punctiform in the range-Doppler matrix, but can also be expanded in range and/or Doppler frequency and form a zone of reflected energy.

Interestingly, the individual local maxima are not separated exclusively along the range axis of the range-Doppler matrix. Of course, the windscreen of a truck, for example, is located at a different distance to the measurement point than the front wall of a trailer or container or the wheels of the trailer. However, if the truck does not approach the measurement point directly, only the projection of the object velocity on the radial direction is measured, as the Doppler frequency shift is a measure of the radial velocity of the reflecting object. However, the cosine of the angle between the radial direction and the direction of travel of the object goes into this projection. Given that this angle is, however, different for different points of an expanded object in particular, different radial velocities take effect for the different positions on the expanded object, such that the individual local maxima are also shifted along the Doppler dimension of the range-Doppler matrix and expanded.

This results, by suitable interpretation, in a complete elimination of the ambiguities of the range-Doppler matrix in the Doppler dimension. Given that the distances and position of the local maxima or other characteristic properties of an expanded reflecting object in the range-Doppler matrix depend on the velocity of the object, the distances and therefore the width and/or shape of the zone of reflected energy can be used to infer an unambiguous speed, even if the range-Doppler matrix is actually ambiguous. However, to be able to utilize this advantage, rather than recognize an expanded reflecting object as an individual maximum in the range-Doppler matrix, it is beneficial to determine a "zone of reflection energy" and to allocate the different local maxima or other cells of the range-Doppler matrix of reflection energy to a single object, wherein said cells are found within such a zone of reflection energy. The unambiguous range of the range-Doppler matrix in the Doppler direction can thus be increased and ideally the ambiguity completely eliminated, so that the range-Doppler matrix can also be accessed in this case by the evaluation algorithms of a neural network. In this case, a suitable interpretation is to analyse the zone of reflected energy from the range-Doppler matrix in a neural network.

Preferably, this method, in which an object with a zone of reflected energy is identified, said zone containing cells of reflected energy of the range Doppler matrix, can be combined with methods in which the useful Doppler evaluation range is increased by appropriate modulation of the emitted radar waves.

In general, it is also possible to resolve range ambiguity using a neural network.

The provision of the range-Doppler matrix preferably comprises the following steps:
  i) receiving the reception signals,
  ii) mixing the reception signals with the transmission signals to form baseband signals and
  iii) calculating a range-Doppler matrix using the baseband signals, wherein the transmission signals are preferably emitted before the reception signals are received. The transmission signals are preferably emitted by a sensor that has at least one transmitting antenna. However, this is not necessary. The method can also be conducted as a "passive radar". In this case, a previously emitted transmission signal is used and therefore the sensor does not need to be able to emit the transmission signals. However, the transmission signals do need to be known. This renders it possible to generate or simulate a reference signal in the sensor, for example, with which the received reception signals are mixed. The range-Doppler matrix is subsequently calculated using the thus generated baseband signals.

Of course, the sensor may also be configured to emit transmission signals and to receive reception signals. To this end, it has at least one transmitting antenna and at least one receiving antenna.

The determination of the range-Doppler matrix is known from the prior art and can be conducted according to the known method.

The transmission signals preferably comprise at least two different types of frequency ramp, which are transmitted successively or simultaneously. Here, the different types of frequency ramp preferably differ in the starting frequency at which the respective frequency ramp begins. The slope of the frequency ramp and the length of the frequency ramp are preferably the same for both types of frequency ramp. However, differences in parameter may of course occur with these different types of frequency ramp.

Preferably, the Doppler frequencies and/or the phase information of the baseband signals, which occurs due to the two frequency ramps, are evaluated in such a way that ambiguities are eliminated when determining the radial velocity. Here, it is preferable to make use of the methods known from the aforementioned documents of the prior art.

Preferably, several antennae are used to emit the transmission signals and/or to receive the reception signals. This enables a significant improvement in the angular resolution of the sensor, since angular information on the position of the object can be obtained from the different propagation times that the signal from a transmission antenna, for example, needs to be reflected and returned to different reception antennae. As a result, it is possible to determine not only the distance of the object from the measurement point, but also the direction in which the measurement point is situated. This is also particularly advantageous for expanded objects, as it allows for the determination of an orientation of the object and/or a velocity vector and therefore also a direction of travel, especially in the case of motor vehicles. This may also be possible in a single measuring cycle. If different local maxima of the range-Doppler matrix or the zones of reflected energy can be allocated to different positions on an object, such as different positions on a truck, an orientation of the object and therefore a direction of travel of the object can be determined from the different directions in which said different positions of the object are detected. The information determined in this way can be used for further evaluation, for instance for controlling a traffic intersection, for statistical purposes or for tracking the misconduct of individual road users. This enables the optimization of tracking information, for example, i.e., the tracking of traffic objects and road users over a measurement period consisting of several measurement cycles.

Preferably, an estimation of the quality of the determined parameter is made in addition to the at least one parameter. In this way, an object can be characterized and classified as a particular vehicle class, for instance. At the same time, the reliability of the parameter result determined in this way is indicated in the form of a probability. This is also possible using a neural network, such as a CNN or DNN.

The invention also solves the problem by way of a device for conducting such a method, wherein the device comprises at least one electronic data processing device, which is configured to conduct the method. Preferably, the device also has at least two transmission antennae and at least one reception antenna for radar beams. Of course, these different components need not be situated at a single point. It is only important that the reception signals picked up by the at least one, but preferably several reception antennae, and the emitted transmission signals are available to the electronic data processing device and/or a mixing device so they can be fed into the further processing. This may occur via communication devices, such as transmission cables, or wireless transfers, such as radio, WiFi or Bluetooth.

In the following, an example of an embodiment of the present invention will be explained in more detail by way of the attached figures: They show:

FIG. 1—the schematic representation of a measuring arrangement and

Figure 2:
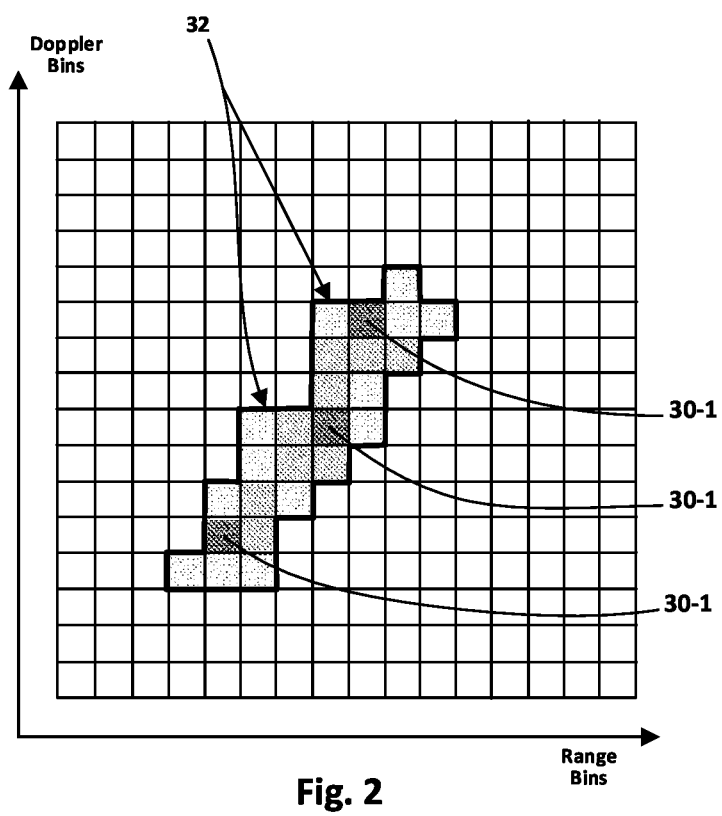

FIG. 2—the schematic section from a range-Doppler matrix.

FIG. 1 schematically depicts a top view of a sensor 2 for emitting and receiving radar waves as well as a truck-trailer unit 4, which features a driver's cab 6, a container area 8 and a trailer 10. The sensor 2 includes a receiving antenna 12, and a signal generator 14, which provides a radar signal to a transmitter antenna 16 and to a mixer 18. The sensor 2 further includes an analog-to-digital (A/D) converter that receives and samples the mixer 18 output and provides the samples to an electronic data processing device 22. The electronic data processing device 22 includes an FFT processing device 24 and a neural net processing device 26.

In the example of an embodiment shown, the entire truck 4 moves at a velocity that is marked on the driver's cab 6 as well as on the container area 8 and the trailer 10, and is represented by the arrow V. The sensor 2 emits radar waves, from the transmitter antenna 16 transmitting of signal generator 14 output. Three directions, 28-1, 28-2, and 28-3, generically referenced herein as "directions 28," are shown which terminate at three different elements of the truck 4 on which the waves are reflected. The above-described sensor 2 receives the reflected radar waves and generates a corresponding range-Doppler matrix. The frequency of the reflected radar waves, which are reflected along the directions 28 back onto the sensor 2, are changed by the Doppler effect. However, the velocity V of the truck 4 plays only a minor role here, as the projection of the velocity V on the respective directions 28 is incorporated in the Doppler effect as radial velocity. In this case, it is clear that the radial velocity R1 of the waves that are reflected from the windscreen of the driver's cab 6 is considerably lower than the radial velocities R2 and R3, respectively, of the waves that are reflected from the container area 8 or the trailer 10.

FIG. 2 schematically depicts a section from the range-Doppler matrix. Three local maxima, individually numbered 30-1, 30-2, and 30-3, and generically referenced herein as "local maxima 30," can be recognized, and are within and are surrounded by a zone of reflected energy, marked on FIG. 2 by a zone of reflected energy outline 32. The zone of reflected energy 32 is formed by the cells of the range-Doppler matrix that contain reflected energy, and FIG. 2 shows examples of such cells by a shading, i.e., a different coloration than white. The three local maxima 30 can be recognized, and are displaced from one another in both the vertical direction, i.e., in the range direction, and the horizontal direction, i.e., in the Doppler direction. This displacement means that the three points of reflection to which the three local maxima 30 belong are at respectively different distances from the sensor 2 and have respectively different radial velocities, i.e., for the visible example, R1, R2, and R3.

REFERENCE LIST 2 sensor
4 truck 6 driver's cab
8 container area
10 trailer
12 receive antenna
14 signal generator
16 transmitter antenna
18 mixer
20 analog/digital (A/D) converter
22 electronic data processing device
24 FFT processor
26 neural network processor
28-1, 28-2, 28-3 directions
30-1, 30-2, 30-3 local maxima
32 outline, zone of reflected energy
V velocity
R1, R2, R3 radial velocity

The invention claimed is:

1. A method for determining at least one parameter of a moving object having spatially separated reflectance surfaces, comprising:
receiving, at a receiving antenna, reception signals that are reflections of transmitted radar signals, from the spatially separated reflectance surfaces;
processing the reflection signals radar signal to provide a range-Doppler matrix;
determining, within the range-Doppler matrix, at least two local maximum cells, each corresponding to and indicating a respective range-radial velocity of a respective different one among the spatially separated reflectance surfaces of the object;
transferring at least a part of the range-Doppler matrix to a neural network, wherein the at least the part includes the at least two local maximum cells; and
determining at least one parameter of the object by the neural network, based at least on the respective range-radial velocity indicated by each of the at least two local maximum cells,
wherein the object is a road user.

2. The method according to claim 1, wherein the at least one parameter is selected from the group consisting of
a distance and/or a radial velocity of the object relative to a measurement point,
an expansion of the object in at least one spatial direction,
a velocity of the object, and
at least one classification property and/or a classification of the object and/or an allocation of a zone of reflected energy to a physical object different from the object.

3. The method according to claim 1, further comprising:
determining a zone of reflection energy in the range-Doppler matrix, the zone of reflection energy comprising a plurality of cells of the range-Doppler matrix indicating reflection energy, wherein the determining the zone of reflection energy is configured to include in the zone of reflection energy the at least two local maximum cells; and
selecting the zone of reflection energy from the range-doppler matrix,
wherein
transferring the at least two local maximum cells comprises transferring the selected zone of reflection energy to the neural network.

4. The method according to claim 1, further comprising transmitting the radar signals, and wherein processing the reception signals comprises mixing the reception signals with transmission signals to form baseband signals, and calculating a range-Doppler matrix using the baseband signals.

5. The method according to claim 4 wherein transmitting the radar signals comprises transmitting at least two different types of frequency ramps, the transmitting being successively or simultaneously.

6. The method according to claim 5, wherein:
the at least one parameter of the object is a radial velocity,
the determining the radial velocity of the object by the neural network is based at least in part on an evaluating, by the neural network, of the respective Doppler frequencies and/or phase information of baseband signals corresponding to the at least two local maximum cells, and
determining the radial velocity of the object by the neural network further comprises eliminating ambiguities.

7. The method according to claim 4, wherein transmitting the radar signal comprises transmitting the radar signals from a plurality of transmitter antennas and/or the receiving antenna is among a plurality of receiving antennas, and receiving the reception signals comprise receiving the reception signals at other among the plurality of receiving antennas.

8. The method according to claim 1 further comprising estimating a quality of the determined parameter.

9. A device for conducting a method according to claim 1, wherein the device comprises at least one electronic data processing device which is configured to conduct the method.

10. The device according to claim 9, further comprising at least one transmission antenna and at least one reception antenna for radar waves.

* * * * *